United States Patent
Kawanobe et al.

(10) Patent No.: US 7,499,284 B2
(45) Date of Patent: Mar. 3, 2009

(54) HAND-HELD GAME MACHINE AND COVER

(75) Inventors: Naoya Kawanobe, Kyoto (JP); Tomoyuki Sakiyama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 106 days.

(21) Appl. No.: 11/368,680

(22) Filed: Mar. 7, 2006

(65) Prior Publication Data
US 2006/0258464 A1 Nov. 16, 2006

(30) Foreign Application Priority Data
May 16, 2005 (JP) ............................... 2005-143099

(51) Int. Cl.
*H05K 5/00* (2006.01)
(52) U.S. Cl. .................. 361/752; 361/800; 361/797
(58) Field of Classification Search ................ 361/752, 361/715, 800, 797, 625; 345/169; 463/37
See application file for complete search history.

(56) References Cited

U.S. PATENT DOCUMENTS

| | | | | |
|---|---|---|---|---|
| 4,969,647 A | * | 11/1990 | Mical et al. ................... 463/31 |
| D320,624 S | * | 10/1991 | Taylor ...................... D21/331 |
| 5,161,803 A | * | 11/1992 | Ohara ........................ 463/44 |
| 5,212,368 A | * | 5/1993 | Hara ......................... 235/375 |
| 6,042,478 A | * | 3/2000 | Ng ........................... 463/44 |
| D449,347 S | * | 10/2001 | Christianson .............. D21/329 |
| 6,865,076 B2 | * | 3/2005 | Lunsford .................... 361/684 |
| 7,020,500 B2 | * | 3/2006 | Saghbini ................... 455/571 |
| 7,172,114 B2 | * | 2/2007 | Fletcher et al. ............. 235/380 |
| D542,855 S | * | 5/2007 | Lim ......................... D21/333 |
| 2002/0094852 A1 | * | 7/2002 | Fujioka et al. ................ 463/2 |
| 2003/0012012 A1 | | 1/2003 | Hong |
| 2003/0021094 A1 | | 1/2003 | Yang |
| 2006/0279039 A1 | * | 12/2006 | Krieger et al. .......... 273/148 B |
| 2007/0184900 A1 | * | 8/2007 | Matsumoto et al. ........... 463/37 |

FOREIGN PATENT DOCUMENTS

JP 10-214135 8/1998

* cited by examiner

*Primary Examiner*—Hung S Bui
(74) *Attorney, Agent, or Firm*—Nixon & Vanderhye P.C.

(57) ABSTRACT

A hand-held game machine (10) includes a horizontally-long rectangular housing (12), and the housing is covered with a cover (14) almost entirely. A main surface of the housing is curved so as to become higher at the center of the housing in a horizontal direction and become lower toward right and left end portions. The cover to be attached on the housing is also curved according to the curve. At a center of the cover, a transparent window (34) is formed, and a display (36) is placed below it on the housing.

4 Claims, 13 Drawing Sheets

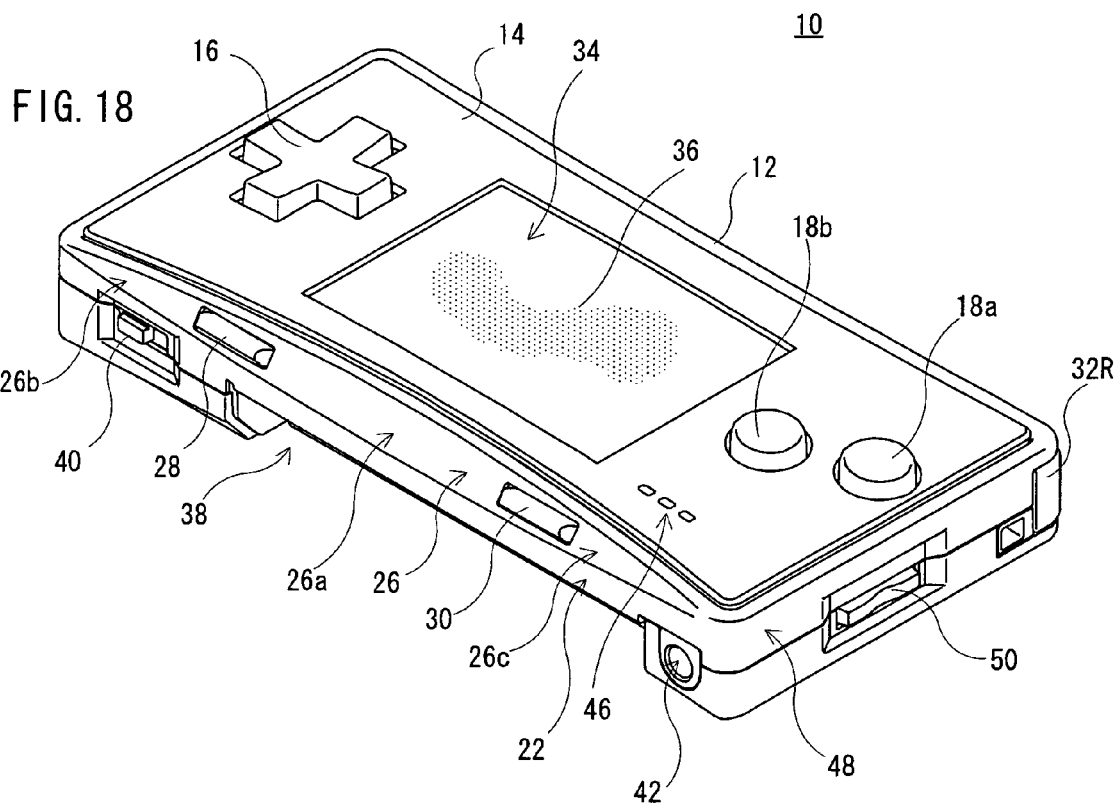

HAND-HELD GAME MACHINE AND COVER

CROSS REFERENCE OF RELATED APPLICATION

The disclosure of Japanese Patent Application No. 2005-143099 is incorporated herein by reference.

BACKGROUND

1. Field

The present illustrative exemplary embodiment relates to a hand-held game machine and a cover. More specifically, the present illustrative exemplary embodiment relates to a hand-held game machine and a cover for the same that permit to operate operating switches and operating keys arranged on a main surface and side surfaces of the housing while the housing is held with both hands.

2. Description of the Related Art

As a related art, there is hand-held shaped information equipment disclosed in the Patent Document 1. The related art disclosed in the Patent Document 1 is constructed so as to cover a display portion with a protective cover slightly larger than the display portion of the hand-held shaped information equipment.

[Patent Document 1] Patent Laying-open No. 10-214135 [G06F1/16, 15/02, H04B1/38, 1/034]

In the Patent Document 1, the display surface of the LCD is protected by the protective cover, but if an excessive force is applied to the protective cover, the force is directly applied to the LCD also, and therefore, there is a problem of easily damaging an LCD.

SUMMARY

Therefore, it is a primary feature of the illustrative implementation to provide a novel hand-held game machine and cover.

Another feature of the illustrative implementation is to provide a hand-held game machine and a cover for the hand-held game machine that are able to reduce a load on a display.

An illustrative exemplary embodiment includes a hand-held game machine and comprises: a housing which has a horizontally-long shape, and has, on a front surface, an opening portion, said front surface having upper and lower peripheral edges which are curved so as to become higher at a center in a horizontal direction and become lower toward the right and left end portions when viewed respectively from upper and lower side surfaces; a display which is provided at a center portion inside the opening portion of the housing and at a position lower than the upper and lower peripheral edges of the front surface when viewed respectively from the upper and lower side surfaces; an operating means which includes a keytop provided at a position higher than the upper and lower peripheral edges of the opening portion when viewed respectively from the upper and lower side surfaces in right and left portions inside the opening portion of the housing; and a cover which is attached onto the housing so as to cover the opening portion in a manner that its upper and lower edges are along the upper and lower peripheral edges of the opening portion, wherein the cover includes a transparent window formed at a position corresponding to a position of the display, and an opening which is formed at a position corresponding to a position of the operating means so as to expose the operating means therethrough.

In the embodiments, the hand-held game machine (10: reference numeral designating a portion corresponding in the embodiments) includes a housing (12), a main surface or a front surface of the housing (12) is a horizontally-long shape, for example. On the main surface, an opening portion for placing a display is formed, and upper and lower peripheral edges of the front surface are curved so as to become higher at a center in a horizontal direction and becomes lower toward the right and left end portions when viewed respectively from upper and lower side surfaces. On the main surface, a display (36) is attached at a position lower than the upper and lower peripheral end potions of the front surface, for example, when viewed respectively from the upper and lower side surfaces, and an operating means is provided at an area except for the area of the display in a manner that a keytop thereof is provided at a position higher than the upper and lower peripheral edges when viewed respectively from the upper and lower side surfaces. A cover (14) is formed in size and shape so as to cover the main surface of the housing (12) almost entirely. The cover is formed with a transparent window (34) at a position corresponding to the position of the display, and an opening is formed at a position corresponding to the position of the operating means. Accordingly, through the transparent window, it is possible to see a displaying on the display, and through the opening, the keytop of the operating means is exposed from the main surface of the housing. Therefore, it is possible for a game player to operate the operating means by use of the keytop.

In the illustrative exemplary embodiment, the main surface of the housing is curved, and the cover is also curved. Accordingly, if a force or a shock is applied to the cover, the force is dispersed due to the curve. Thus, the force or shock is never directly transmitted to the display existing below the cover, and therefore, it is possible to protect the display. At this time, the upper and lower peripheral edges are curved so as to become higher at a center in a horizontal direction and become lower toward the right and the left edges when viewed respectively from the upper and lower side surfaces. In addition, the display is provided at a position lower than the upper and lower peripheral edges of the opening portion when viewed respectively from the upper and lower side surfaces, and therefore, the display (36) is protected by the cover. On the other hand, the keytop of the operating means is provided at a position higher than the upper and lower peripheral edges of the opening portion when viewed respectively from the upper and lower side surfaces, and therefore, the keytop of the operating means is liable to expose from the cover.

An illustrative exemplary embodiment includes a hand-held game machine, wherein the operating means includes at least two operating means having keytops different in shape from each other at right and left positions sandwiching the display on the main surface, and the opening of the cover includes two openings corresponding to the shape of the keytops of the respective operating means at right and left positions sandwiching the transparent window.

In the illustrative exemplary embodiment, the two operating means are a cross key (16), and an A button and a B button (18a, 18b). Shapes of the keytop of the cross key (16), and the A button and the B button (18a, 18b) are cross and circle, respectively. Accordingly, the cover is formed with a cross-shaped opening (64) and a circle openings (66a, 66b). Then, if viewing the openings having such different shapes, an operator never turns the cover upside down and confuses right and left of the cover. Thus, if the cover is constructed to be detachable from the housing, mix-up of the direction of the cover never occurs when the cover is attached.

An illustrative exemplary embodiment includes a hand-held game machine, and wherein at least the lower peripheral edge of the opening portion is formed so as to curve inwardly to the opening portion when viewed from front, the housing is provided with an operating means arranging area below the lower peripheral edge of the opening portion on the front, and an operating means is provided at the operating means arranging area.

In the illustrative exemplary embodiment an inclined surface (26) connecting the front or the main surface of the housing and the lower side surface (22) is formed, and this is utilized as an operating means arrangement area where a operating means such as a start switch (28) and a select switch (30) is provided. The operating means is exposed blow a lower side of a curve, and this eliminates a necessity of forming openings for the operating means, making it possible to ensure strength of the cover.

An illustrative exemplary embodiment includes a cover for hand-held game machine provided with a housing which is horizontally-long shaped, and has, on a front surface, an opening portion, said front surface having upper and lower peripheral edges which are curved so as to become higher at a center in a horizontal direction and become lower toward the right and left end portions when viewed respectively from upper and lower side surfaces; a display which is provided at a center portion inside the opening portion of the housing and at a position lower than the upper and lower peripheral edges of the front surface when viewed respectively from the upper and lower side surfaces; and an operating means which includes a key top provided at a position higher than the upper and lower peripheral edges of the front surface when viewed respectively from the upper and lower side surfaces in a right and left portions inside the opening portion of the housing, comprising: a transparent window having shape to cover the main surface of the housing and formed at a position corresponding to a position of the display, and an opening which is formed at a position corresponding to a position of the operating means so as to expose the operating means therethrough.

According to the present illustrative exemplary embodiment, the main surface of the housing and the cover to be attached thereto are also curved, and therefore, even if a force or shock is applied to the cover, the force or shock is dispersed along the curve, eliminating a possibility of the force or shock being directly applied to the display existing below the cover, and capable of protecting the display.

The above described features, aspects and advantages of the present illustrative exemplary embodiment will become more apparent from the following detailed description of the present illustrative exemplary embodiment when taken in conjunction with the accompanying drawings.

FIG. 18 is a perspective view showing a modified example in which positions of the start switch and the select switch are changed.

FIG. 19 is a cross-sectional illustrative view showing structure of the start switch and the select switch shown in FIG. 17 in an enlarged manner.

DETAILED DESCRIPTION OF THE PREFERRED EMBODIMENTS

Figure 1:
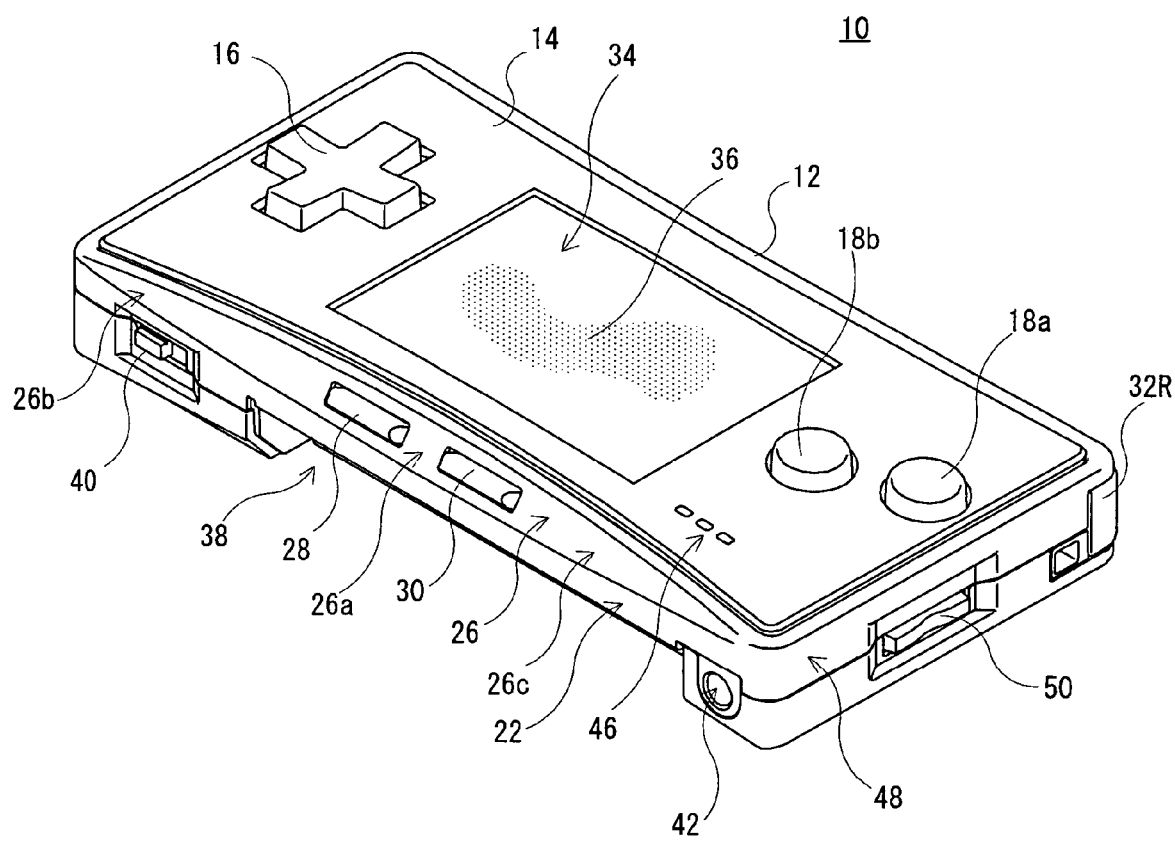
FIG. 1 is a perspective view showing a top surface, a front surface, and a right side surface of a hand-held game machine of one embodiment.
Figure 2:
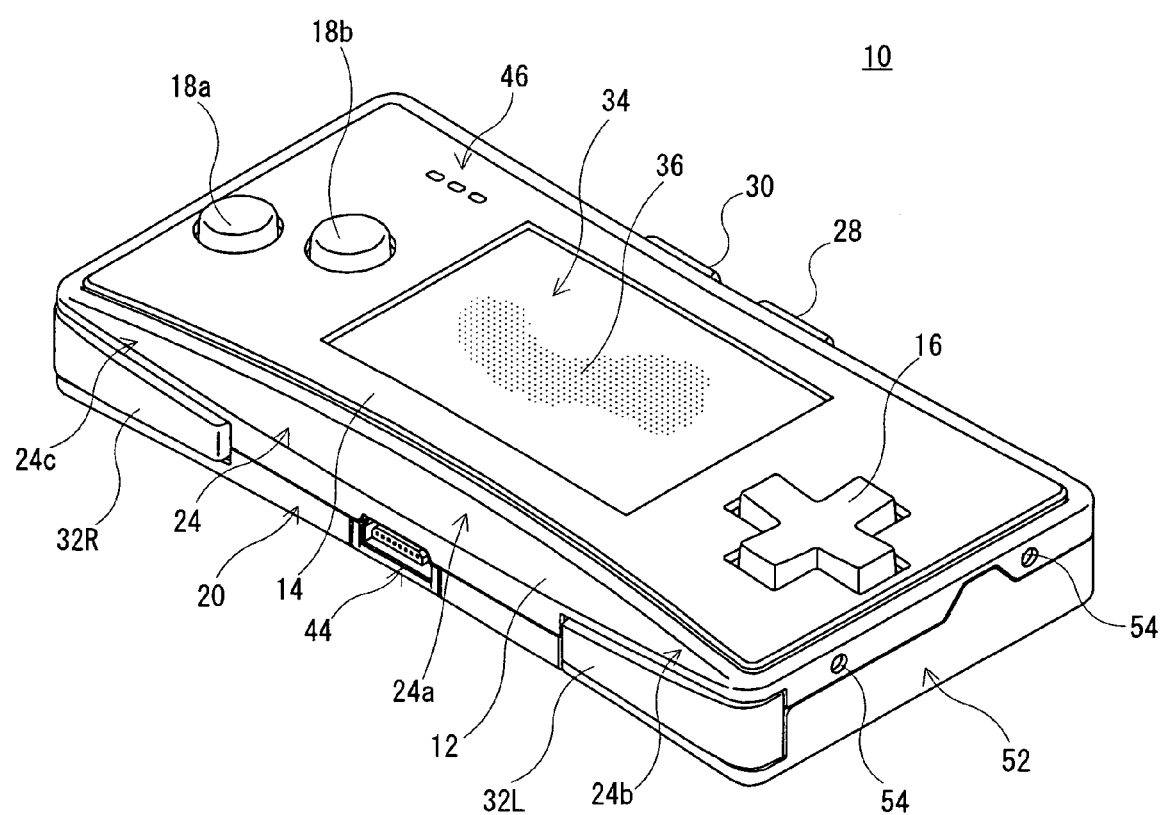
FIG. 2 is a perspective view showing the top surface, a rear surface, and a left side surface of the hand-held game machine of the embodiment.

Referring to FIG. 1 and FIG. 2, a hand-held game machine 10 of an illustrative exemplary embodiment includes a horizontal-long housing 12 made of a thin sheet of metal through bending, for example. As one example, an aspect ratio of the housing 12 is 1:2. It is noted that it is not limited to the aspect ratio. Then, a vertical dimension of the housing 12 (right and left sides) may be 4-6 centimeters as one example and is 5 centimeters in this embodiment. However, the dimensions are merely examples. On a top surface (top main surface) of the housing 12, a cover 14 made of a thin sheet of plastic, for example, is detachably mounted. The cover 14 has a size and shape capable of almost covering over an entire area of the top main surface of the housing 12. On the top surface of the housing 12, a cross key 16 functioning as a direction designating operator and an A button 18a and a B button 18b are respectively provided on left and right sides thereof such that they come through and protrude through the cover 14. It is noted that the cross key 16 or either of the A buttons 18a and the B button 18b may be omitted.

The cross key 16 is a digital joystick, and is able to, by operating any one of four depression portions, designate a moving direction of a character or object operable by a game player (player character or player object), and a cursor.

The A button 18a is formed by a push button switch, and allows the player character to perform an arbitrary action, except for instructing or designating the direction, such as hitting (punching), throwing, holding (obtaining), riding, jumping, etc. For example, in an action game, it is possible to apply an instruction of jumping, punching, moving weapons, etc. In a role-playing game (RPG) and a simulation RPG, it is possible to apply an instruction of obtaining an item, selecting and determining weapon or command, etc. The B button 18b is also formed by the push button switch, and is utilized for changing a game mode selected by a select switch 30 described later, canceling an action determined by the A button 18a, and so forth.

The cross key 16, and the A button 18a and the B button 18b, described above, may be called front operating means because the top main surface is a front side in the game machine 10.

Figure 3:
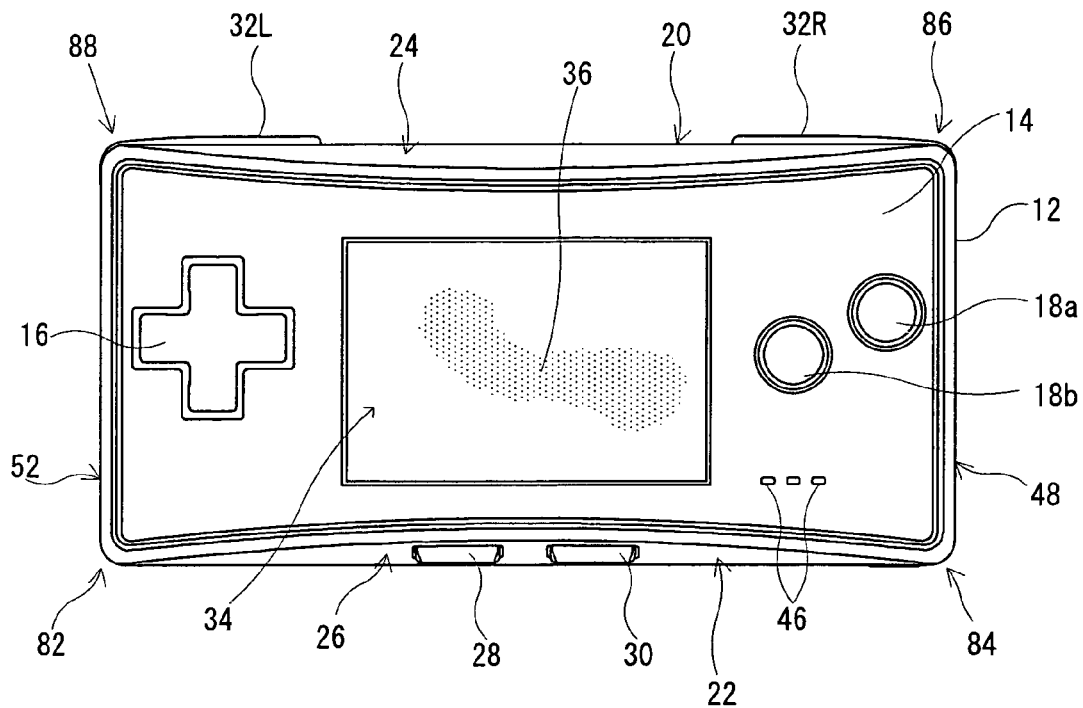
FIG. 3 is an illustrative view showing a state when viewing the top surface of the hand-held game machine shown in FIG. 1 and shown FIG. 2 in plane, top plane view.
Figure 4:
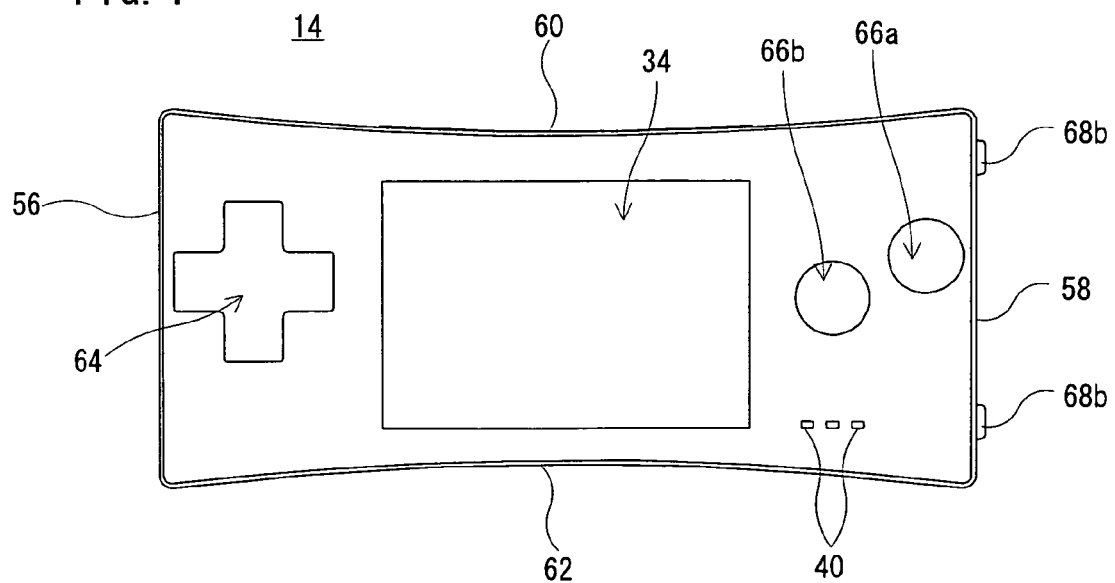
FIG. 4 is an illustrative view showing a state when viewing a cover detachably attached to the hand-held game machine in the embodiment in plane, top plane view.

A shape of the housing 12 when viewed in plane is a rectangular shape having a predetermined aspect ratio, but a shape of the top surface has a horizontally-long pincushion shape as can especially be understood from FIG. 3. Here, the pincushion shape means that center portions of upper and lower sides of a rectangular shape are inwardly curved in arc shape. Thus, the top main surface of the housing 12 is formed in the pincushion shape, so that the cover 14 when viewed from the plane is also formed in the pincushion shape as shown in FIG. 4.

The housing 12 is rectangle, and the housing 12 has an upper side surface 20 and a lower side surface 22, and also formed with an inclined surface 24 connecting the upper side surface 20 and the top surface, and an inclined surface 26 connecting the lower side surface 22 and the top surface. The inclined surface 24, as especially understood from FIG. 2, is formed so as to rise from the upper side surface 20 to the top surface, and the inclined surface 26 is, as especially understood from FIG. 1, is formed so as to rise from the lower side surface 22 to the top surface. As described above, plane shapes of the top surface of the housing 12 and the cover 14 each has the pincushion shape, so that the above-described upper inclined surface 24 has a center portion 24a having a maximum width, and a left portion 24b and a right portion 24c that narrowly extend from the center portion 24a to both the right and left sides. Similarly, the lower inclined surface 26 has a center portion 26a having a maximum width, and a left portion 26b and a right portion 26c that narrowly extend from the center portion 26a to both the right and left sides.

In the hand-held game machine 10 of this embodiment, at the center portion 26a of the lower inclined surface 26 of the housing 12, a start switch 28 and the select switch 30 each of which is a push button switch are provided. The start switch 28 is utilized for starting (restarting) a game, temporarily stopping (pausing) of the game, and so forth. The select switch 30 is utilized for a game mode selection, etc.

Thus, although the lower inclined surface 26 is provided with the start switch 28 and the select switch 30 in this embodiment, the upper inclined surface 24 has no switches, so that by eliminating the upper inclined surface 24, alteration is made on the upper side of the housing 12 such that the top main surface and the upper side surface 20 are directly connected with each other. It is noted that forming the inclined surfaces 24 and 26 up and down is for reasons of design.

On the upper side surface 20 of the housing 12, a left switch 32L and a right switch 32R each having horizontally-long keytop 90L (FIG. 13-FIG. 15) are provided. The left switch 32L and the right switch 32R are constructed by a push button switch, and can be used as an operation similar to the A button 18a and the B button 18b, respectively and can also be used as a subsidiary operation of the A button 18a and the B button 18b, respectively. The left switch 32L and the right switch 32R are provided on the upper side surface of the hand-held game machine 10, and may thus be called an upper side surface operating means.

The cover 14 is formed with a horizontally-long transparent window 34 at approximately the center thereof, and below the transparent window 34, a display 36 formed of an LCD (liquid crystal display) attached to the top surface of the housing 12 is placed. Accordingly, the player can view the game screen (formed by the player object, non-player objects, background images, etc.) to be displayed on the display 36 through the transparent window 34 of the cover 14. It is noted that the display 36 may be replaced with other type of displays not an LCD, an EL (Electronic Luminescence), etc. for example.

In the hand-held game machine 10 of this embodiment, a memory cartridge (not illustrated) is utilized as a program storage medium for game machine, and for attachment of the game cartridge, a cartridge insertion slot 38 is formed on the lower side surface 22 of the housing 12 with a portion thereof being opened or notched. Then, a cartridge connector not shown is placed at a recess of the cartridge insertion slot 38, and by connecting the game cartridge to the connector, program data stored in advance in a semiconductor ROM or RAM, a flash memory, or the like that is incorporated in the game cartridge can be developed in a memory of a game computer (not illustrated) having a CPU (MPU) controlling an overall operation of the hand-held game machine 10 to execute them. In this case, as well known, the game computer controls an advance of the game dependent on an operation state of each of the operating means 16, 18a, 18b, 28, 30, 32L, 32R.

Beside the cartridge insertion slot 38 on the lower side surface 22 of the housing 12, a power switch 40 is provided. The power switch 40 which is a slide switch in this embodiment may be constructed by a push button switch. On the lower side surface, a headphone connection terminal 42 is provided at a side opposed with the power switch 40 sandwiching the cartridge insertion slot 38 therebetween.

An expansion connector 44 is provided at approximately the center of the upper side surface 20 of the housing 12 between the left switch 32L and the right switch 32R. The expansion connector 44 can be connected with various function expansion elements. For example, when a wireless unit (not illustrated) is inserted into the expansion connector 44, the hand-held game machine 10 of the embodiment can form a wireless network by use of a feeble radio wave, for example, and can transmit and receive data between respective game machines in a wireless manner. Accordingly, it is possible to play the same game between a large number of game machines. It is noted that when a connecting cable (not illustrated) is connected to the expansion connector 44, it is possible to receive and transmit data through the connecting cable, and to play a match-up game between two game machines. Furthermore, by connecting the hand-held game machine 10 with the use of the connecting cable connected to the expansion connector 44 with a controller port of another game machine main body (game console), it is possible to use the hand-held game machine 10 as a controller of the game machine main body.

Sound release holes 46 for releasing a sound from a speaker 45 (FIG. 7) is formed below the B button 18b of the top surface of the housing 12. A volume/backlight adjustment switch 50 for adjusting an output volume from the speaker 45 is provided at the right side surface 48 of the housing 12. The volume/backlight adjustment switch 50 is used for adjusting light amount of the backlight when the display 36 is an LCD as well as the volume of the speaker.

On the left side surface 52 of the housing 12, an insertion hole 54 to which an ejector 80 (FIG. 10) is inserted in removing the cover 14.

Figure 5:
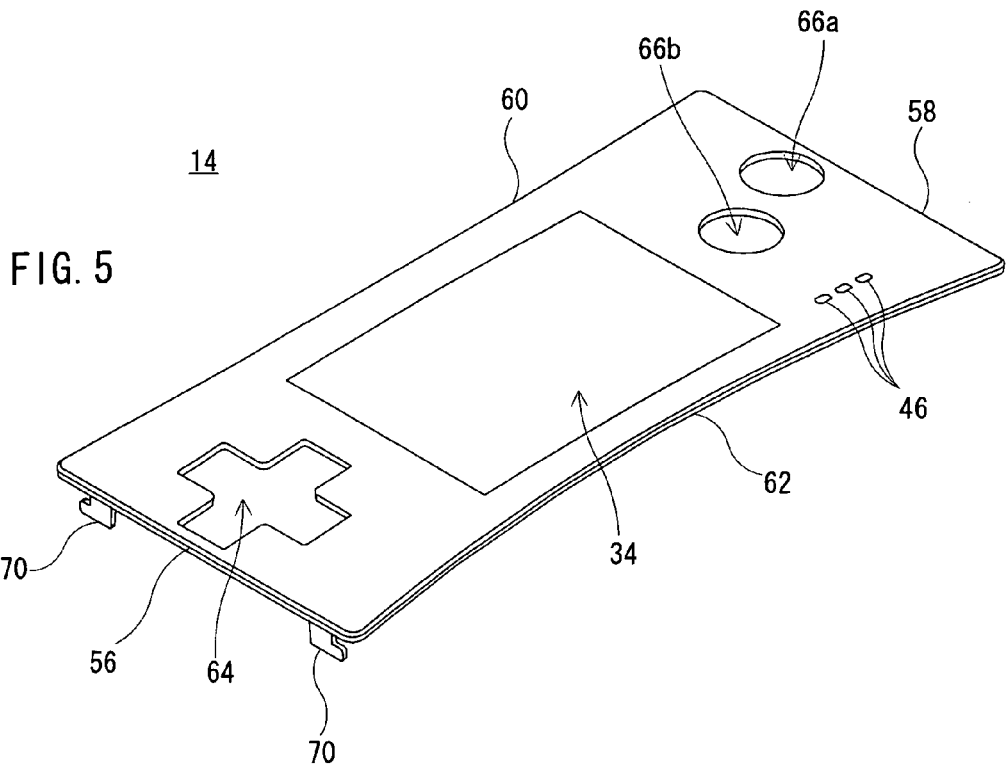
FIG. 5 is a perspective view showing a top surface, a left side surface, and a front surface of the cover in FIG. 4.
Figure 6:
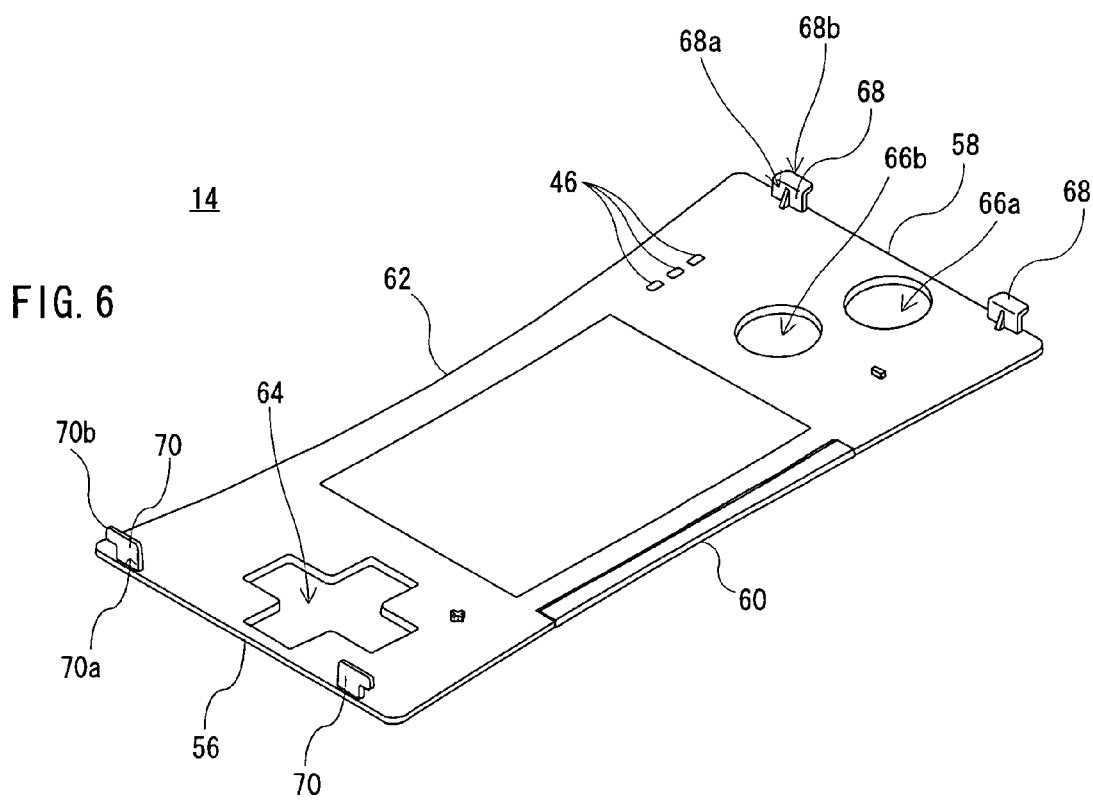
FIG. 6 is a perspective view showing a bottom surface, a left side surface, and a rear surface of the cover in FIG. 4.

Referring to FIG. 4-FIG. 6, the cover 14 has a size and a shape so as to cover almost entire area of the top surface of the housing 12, and has an outline of a pircussion shape formed by right and left sides 56 and 58 and upper and lower curving sides 60 and 62 according to the shape of the top main surface of the housing 12 in this embodiment, and has the above-described transparent window 34 at the center thereof. For example, if an entire portion of the cover 14 is made of transparent resin, and it is colored from the back thereof with a portion of transparent window 34 remained as it is, it is possible to easily form the transparent window 34. Also, changing in color and pattern allows various covers to be produced.

At a left side of the transparent window 34 on the cover 14, a cross-shaped opening 64 for exposing a keytop of the cross key 16 is formed, and at a right side of the transparent window 34, circle openings 66a and 66b for exposing keytops of the respective A button 18a and B button 18b are formed. Below the B button opening 66b, the above-described sound release holes for speaker 46 are formed.

As describing later with referring to FIG. 8-FIG. 10, the cover 14, which is detachable to the housing 12, is provided with the openings 64 and 66 (FIG. 4-FIG. 6) that are similar to the shapes of the keytops of the operation key and the operating switch each having different shapes at left and right portions sandwiching the transparent window 34 on the cover 14. Therefore, merely observing the shapes of the openings, it is possible to easily identify the up and down and right and left of the cover 14. Even children never turn the cover 14 upside down and confuse right and left of the cover 14 in attaching it to the housing 12.

At a right edge of a rear surface (bottom surface) of the cover 14, a pair of engaging hooks 68 for attaching the cover 14 to the housing 12 is provided, and at a left edge, a pair of engaging hooks 70 is similarly provided. Each of the engaging hooks 68, as especially understood from FIG. 6, has a vertical piece 68a vertically extending from the rear surface of the cover 14 and an engaging piece 68b bending from a tip end of the vertical piece 68a and outwardly extending to the right side 58. The tip of the engaging piece 68b outwardly protrudes from the right side 58 of the cover 14. Each of the engaging hooks 70, as especially understood from FIG. 6, has a vertical piece 70a extending from the rear surface of the cover 14 and an engaging piece 70b bending from a tip end of the vertical piece 70a to the upper and lower bending sides 60 and 62 in the same plane as the vertical piece 70a. Since the engaging piece 70b is in the same plane as the vertical piece 70a, it never protrudes from the left side 56 of the cover 14.

Figure 7:
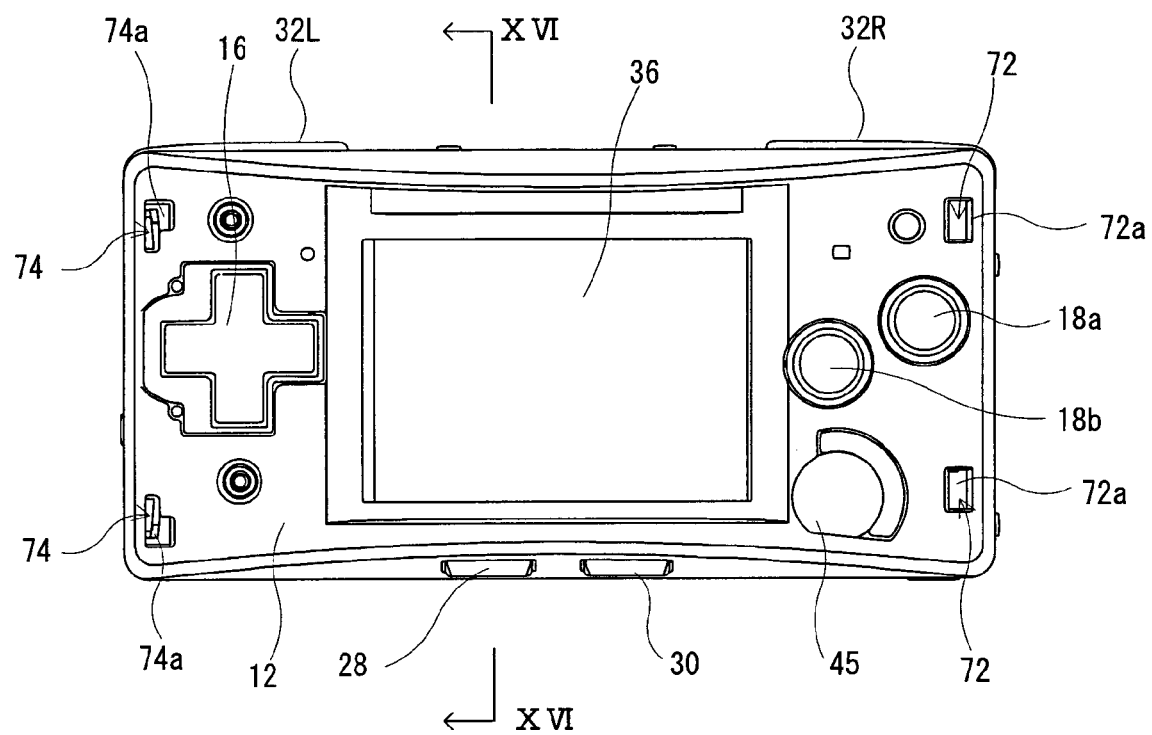
FIG. 7 is a top plane view showing a state that the cover of the hand-held game machine in the embodiment is removed.

FIG. 7 shows a top plane view of the hand-held game machine 10 with the cover 14 removed. As understood from FIG. 7, the display 36 is provided at the center of the housing 12 and under the transparent window 34 of the cover 14. That is, the opening for arranging the display 36 at a predetermined range, roughly the entire area in this embodiment, is formed on the front of the housing 12 (top main surface), and upper and lower peripheral edges of the opening are curved to become the highest at the center in the horizontal direction viewed from the upper and lower sides and gradually become lower toward ends of the right and left sides according to the above-described upper and lower bending sides 60 and 62. At the center of an inside the opening, the display 36 is placed at a position lower than the upper and lower peripheral edges when viewed from the upper and lower sides. Then, as sandwiching the opening, that is, the display 36, on the top surface of the housing 12, the cross key 16, and the A button 18a and B button 18b are respectively provided on the left side and on the right side. These operating means are provided such that the keytops thereof become higher positions than the upper and lower peripheral edges of the opening when viewed from the upper and lower sides. The keytops of the operating means are exposed to the top surface of the cover 14 through the opening 64, the openings 66a and 66b of the cover 14. Then, the speaker 45 is provided at a position beneath the sound release holes 46 of the cover 14.

A pair of engaging holes 72 are formed at positions sandwiching the A button 18a at a right end portion of the top surface of the housing 12. A position of each of the engaging holes 72 corresponds to the position of each of the engaging hooks 68 of the cover 14. That is, the pair of engaging holes 72 is for engaging with the pair of engaging hooks 68. An engaging piece 72a is formed on an inner edge of the engaging hole 72 at an outer side of the housing 12.

A pair of engaging holes 74 are formed at positions sandwiching the cross key 16 at the left end portion of the top surface of the housing 12. A position of each of the engaging holes 74 corresponds to the each of the position of the engaging hooks 70 of the cover 14. That is, the pair of engaging holes 74 is for engaging a pair of engaging hooks 70. As especially understood from FIG. 8 and FIG. 9, an engaging piece 76 is provided under the engaging hole 74. The engaging piece 76 engages with the engaging piece 70b of the engaging hooks 70 of the cover 14 shown in FIG. 5 and FIG. 6 in a manner shown in FIG. 9 to prevent the engaging hook 70 from being disengaged from the engaging hole 74.

Figure 9:
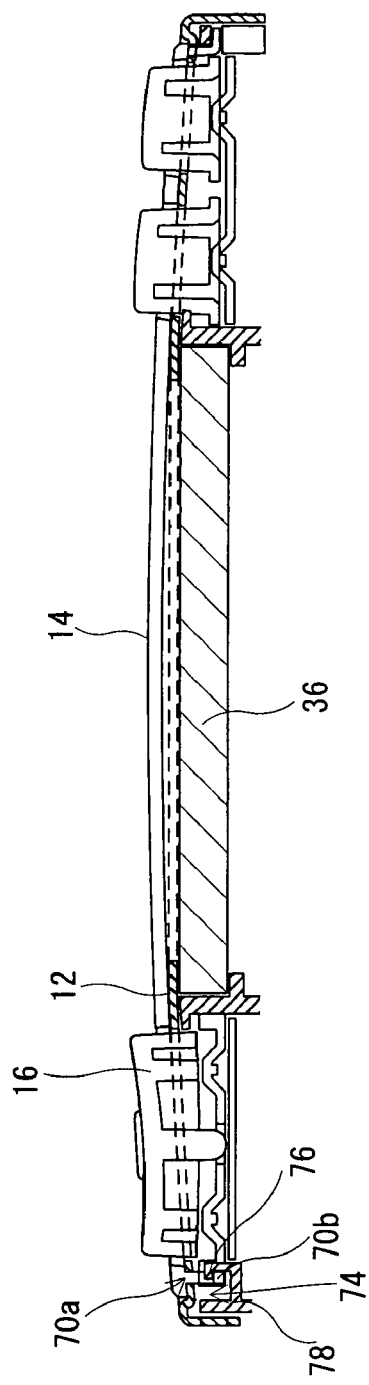
FIG. 9 is an illustrative view showing a state that by rotating the cover from the state in FIG. 8, an engaging hook provided at an other end of the cover is engaged with an engaging hole provided at an other end of the housing.
Figure 10:
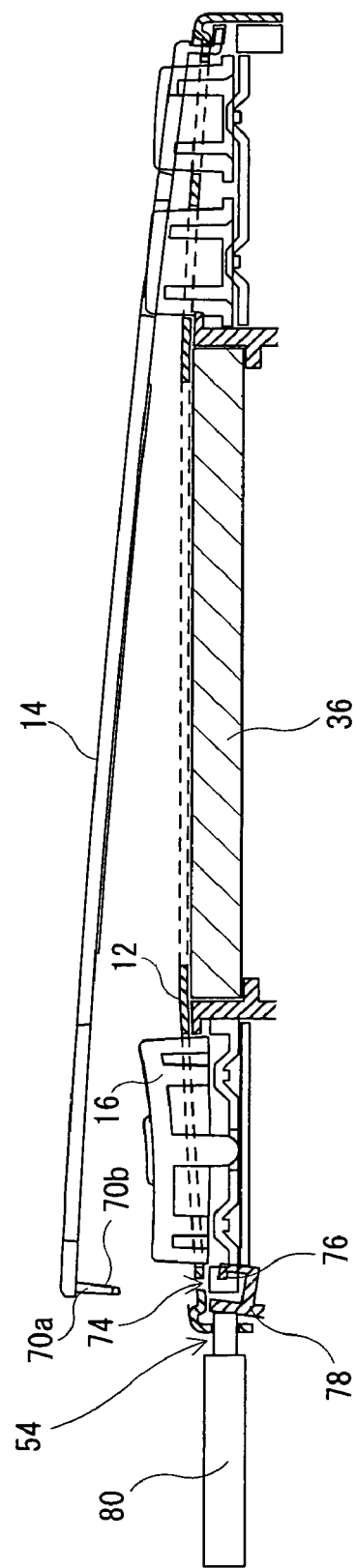
FIG. 10 is an illustrative view showing a state when the cover is removed from the state in FIG. 9.

On the other hand, the engaging piece 76 is formed integral with a depressed portion 78 (FIG. 9 and FIG. 10). By inserting the ejector 80 through the insertion hole 54 formed on the left side surface 52 of the housing 12, it is possible to depress the depressed portion 78. When the depressed portion 78 is depressed by the ejector 80, the engaging piece 76 integrally formed therewith is also depressed to be inclined inwardly as shown in FIG. 10. Accordingly, engagement of the engaging piece 70b and the engaging piece 76 is released.

Figure 8:
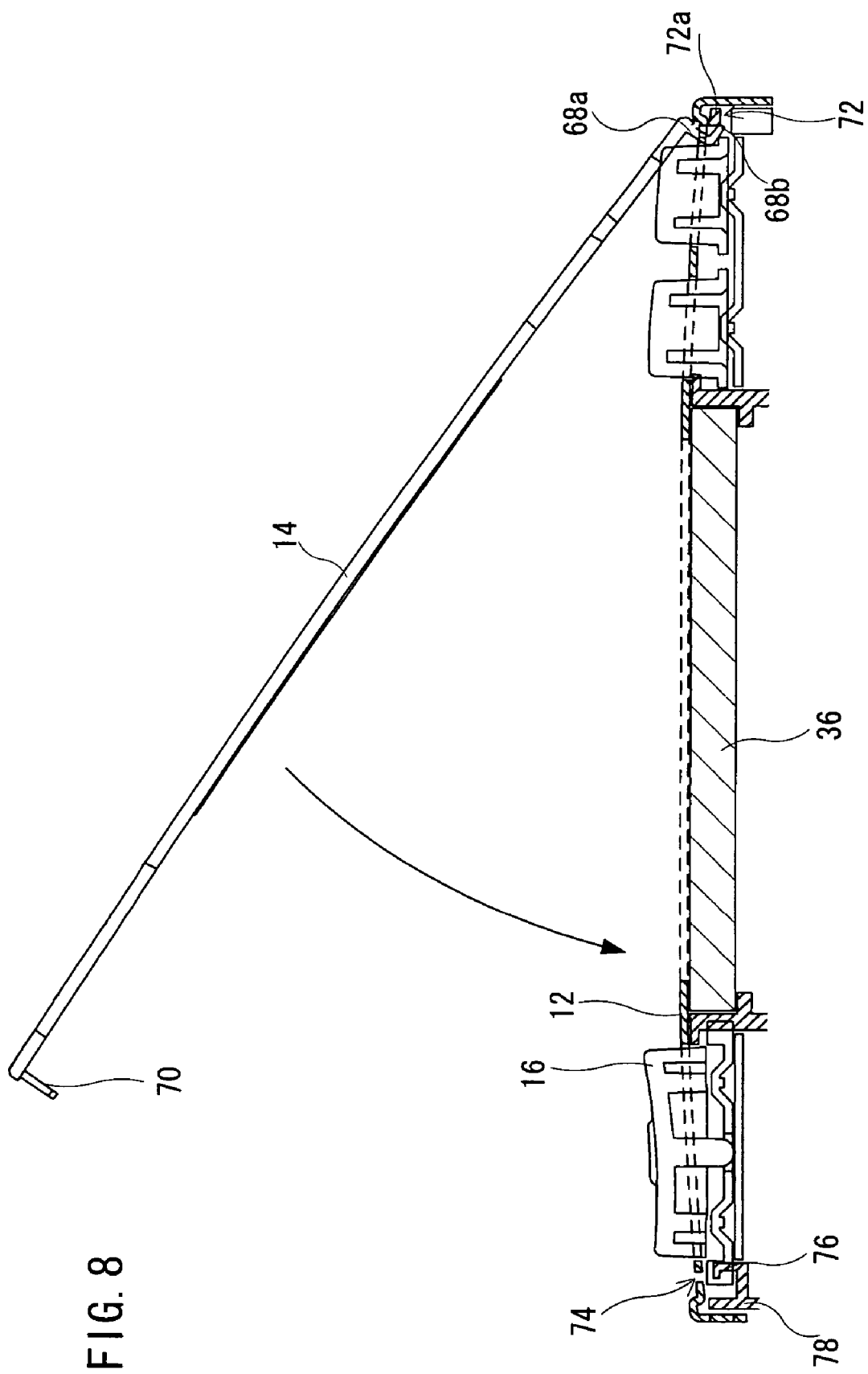
FIG. 8 is an illustrative view showing a state that an engaging hook provided at one end of the cover is inserted into an engaging hole provided at one end of the housing so as to attach the cover.

In order to attach the cover 14 to the hand-held game machine 10, that is, to the housing 12, the engaging piece 68b of the engaging hook 68 is inserted into the engaging hole 72 in a state that the cover 14 is raised as shown in FIG. 8. The cover 14 is tilted as shown by the arrow in FIG. 8 in that state, and the engaging piece 70b of the engaging hook 70 of the cover 14 is inserted into the engaging hole 74. Then, the engaging piece 76 is engaged with the engaging piece 70b. Accordingly, the cover 14 is held by the engagement between the engaging hook 68 and the engaging hole 72 at one end, and by the engagement between the engaging hook 70 and the engaging hole 74 at the other end.

In order to remove the cover 14, as shown in FIG. 10, the ejector 80 is inserted into the insertion hole 54 on the left side surface 52 of the housing 12. Then, the ejector 80 tilts the depressed portion 78, i.e., the engaging piece 76 to disengage the engaging piece 70b from the engaging piece 76. When the cover 14 is picked up in that state so as to be raised as shown in FIG. 8, the engaging hook 68 is disengaged from the engaging hole 72, capable of removing the cover 14.

In the hand-held game machine 10 of this embodiment, there is provided with the cover 14 above the display 36 such as an LCD, for example, so that it is possible to more effectively protect the display 36 than a game machine with a directly exposed display 36. The top main surface of the housing 12 has a center slightly curved so as to be raised toward the top main surface than the right and left side edges as shown in FIG. 1, FIG. 2 and further FIG. 8-FIG. 10 (in these Figures, a dotted line indicates a curved state and a position of the housing 12), and the cover 14 is also curved accordingly, so that it is possible for the cover 14 to easily disperse a received force from the center being the most raised portion to the right and left sides directions. Therefore, even if an excessive force is applied to the cover 14 during a game play is usually performed with the use of the hand-held game machine 10, or if the hand-held game machine 10 is dropped or bumped against object, a force or shock at that time is not directly transmitted to the display 36, but dispersed by or absorbed into the cover 14 once to be transmitted to the display 36, thus capable of protecting the display without excessive load on the display 36. Since a space is formed between the cover 14 and the display 36 as understood from FIG. 9, for example, a protective effect of the display 36 by such the cover 14 is remarkable.

It is noted that if a degree of curve (illustrated by the dotted line) on the top main surface of the housing 12 and a degree of curve of the cover 14 are little difference from each other, one may be larger than or smaller than the other.

For example, when the former is larger the latter in the degree of curve, that is, when a curvature of the cover 14 is less than that of the housing 12, the engaging hooks 68 and 70 are inserted into the engaging holes 72 and 74 by applying a bending force to the cover 14 at a time of attachment of the cover 14. In this case, after attachment of the cover 14, the cover 14 intends to restore to an original state with small curvature, and the engaging hooks 68 and 70 are deformed in an outwardly extending direction, and therefore, the engaging hooks 68 and 70 are leaned against the inner peripheral edge of the engaging holes 72 and 74 at the outer sides of the housing. This advantageously prevents the engaging hooks 68 and 70 from being disengaged from the engaging holes 72 and 74, respectively.

In this manner, the cover 14 not through bending and thus in a plane state my be used, although this depends on a flexibility to what extent the cover withstands the bending strength.

In addition, although there is a clearance (space) between the cover 14 and the display 36 in this embodiment, the top main surface of the housing 12 and the rear surface of the cover 14 are intimately contacted with each other as understood from FIG. 9, for example, it is possible ensure an enough amount of upward protrusion of the keytops of the cross key 16 and the A button 18a and the B button 18b from the cover 14. That is, supposing that a space is ensured between the top main surface of the housing 12 and the rear surface of the cover 14 over an entire area in order to form a clearance (space) between the cover 14 and the display 36, the protrusion amount of the keytops of the cross key 16 and the A button 18a and B button 18b from the cover 14 is accordingly decreased, causing a necessity to change the height of the keytop itself and being a factor of high costs. However, there is no spaces between the cover 14 and the housing 12 at the area where the operation key and the operating switches are provided, it is possible to ensure a protrusion amount without changing the heights of the keytops.

Additionally, if an antireflection process is applied to the transparent window 34 of the cover 14, it is possible to further improve visibility (legible or easy to view) of the display 36 provided under it.

Figure 11:
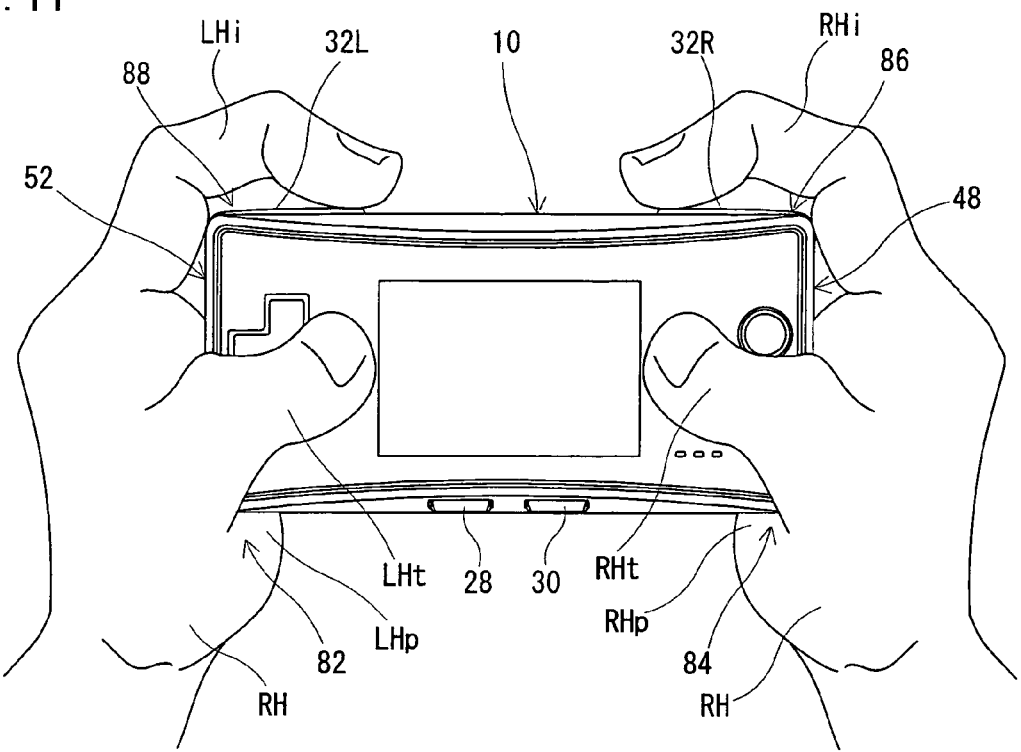
FIG. 11 is an illustrative view showing a state that an operating switch and an operation key on a top surface are operated while the hand-held game machine in the embodiment is held with hands.

In a case of playing a game on the hand-held game machine 10 in the embodiment, the player, as shown in FIG. 10 and FIG. 11, presses palms LHp and RHp of a left hand LH and a right hand RH against the game machine 10, that is, the lower right and left corners 82 and 84 (FIG. 3) of the housing 12 such that the right side surface 48 of the housing 12 is matched with the palm RHp of the right hand RH, and the left side surface 52 of the housing 12 is matched with the palm Hp of the left hand LH. In this state, an index finger RHi of the right hand RH is set so as to position its second joint at the upper right corner 86 of the housing 12 (FIG. 3), and to reach its tip to the right switch 32R. Similarly, an index finger LHi of the left hand LH is set so as to position its second joint at the upper left corner 88 of the housing 12, and to reach its tip to the left switch 32L.

Figure 12:
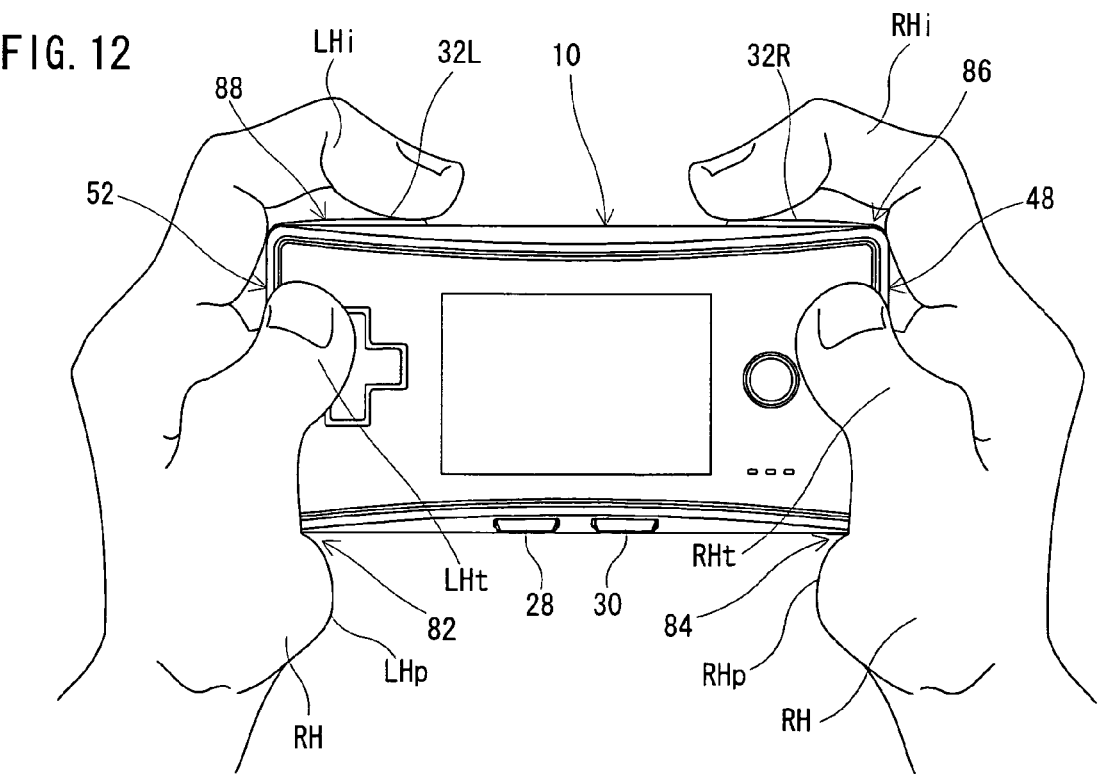
FIG. 12 is an illustrative view showing a state, different from FIG. 10, in that the operating switch and the operation key on the top surface are operated while the hand-held game machine in the embodiment is held with the hands.

A thumb RHt of the right hand RH is for mainly operating the A button 18a or the B button 18b, and a thumb LHt of the left hand LH is for operating the cross key 16. FIG. 11 shows a state in which the B button 18b is depressed by the thumb RHt of the right hand RH, and the right direction designating portion of the cross key 16 is depressed by the thumb LHt of the left hand LH. A state shown by FIG. 12 is a state in which the A button 18a is depressed by the thumb RHt of the right hand RH, and the left direction designating portion of the cross key 16 is depressed with the thumb LHt of the left hand LH. An operation state of FIG. 11 is a state that both of the thumbs RHt and LHt are set at the innermost positions, and an operation state of FIG. 12 is a state where both of the thumbs RHt and LHt are set at the outermost positions. In either states, the game machine 10 in the embodiment is fairly compact, and therefore, unless the left and right side surfaces 48 and 52 of the game machine 10 are tightly supported by the right and left palms RHp and Lhp and the index fingers RHi and LHi of the player, the game machine 10 totterily moves. That is, it is necessary to put the left and right palms LHp and RHp with the left and right side surfaces 48 and 52 of the game machine 10. In this state, it is the fingertips of the index fingers RHi and LHi that can be relatively freely moved. Therefore, if the right switch 32R and the left switch 32L are arranged so as to be operated with inner surfaces (balls) or bases of the index fingers like conventional game machines, less operability occurs.

Figure 13:
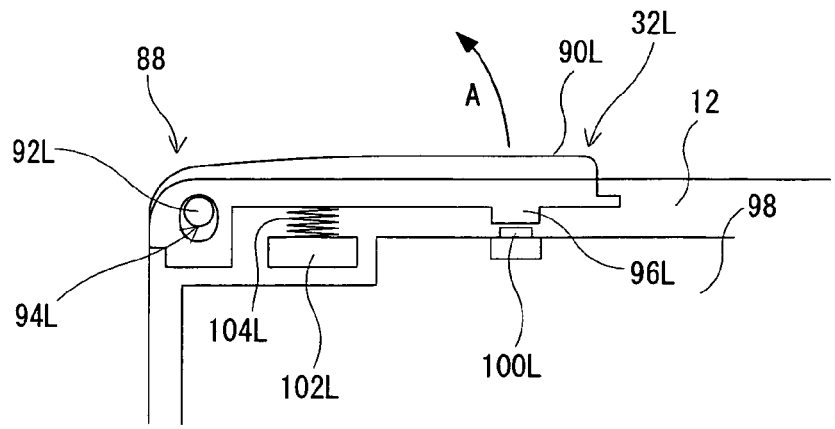
FIG. 13 is an illustrative view showing a released state of an L (left) switch provided on an upper side surface of the embodiment.
Figure 14:
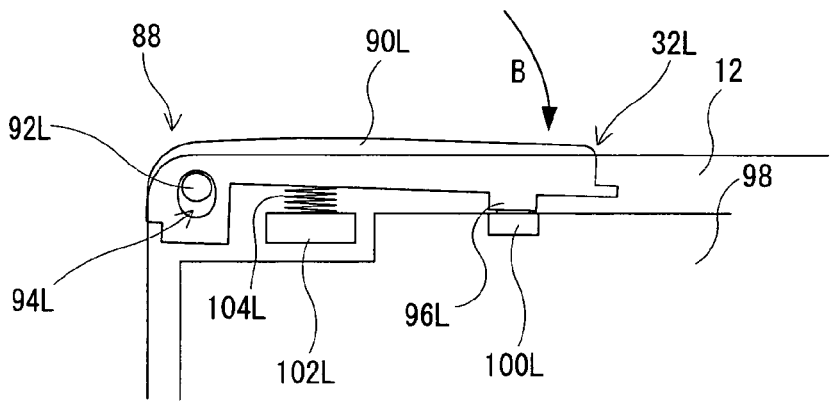
FIG. 14 is an illustrative view showing a depressed state of the L switch in FIG. 13.
Figure 15:
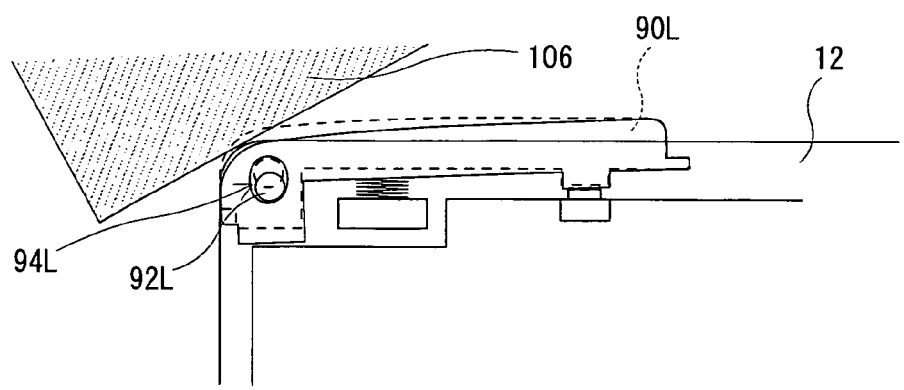
FIG. 15 is an illustrative view showing a state in which an object is bumped against a corner of the L switch in FIG. 13.

Therefore, in the hand-held game machine 10 of the embodiment, the left switch 32L (and right switch 32R) functioning as an operating means (upper side surface operating means) or the first operating means is modified as shown in FIG. 13 and FIG. 14 to enable an operation with the fingertip of the index finger LHi (and RHi). In addition, although FIG. 13 and FIG. 14 indicate only the left switch 32L, it is pointed out in advance that the right switch 32R is also constructed similarly (symmetrical).

Referring to FIG. 13, the left switch 32L has a horizontally-long keytop 90L, and one end (nearer the center of the housing 12 in the horizontal direction) of the keytop 90L becomes a free end, and at an other end opposed thereto is provided a pin 92L. The pin 92L is inserted into a bearing 94L formed on the upper left corner 88 of the housing 12. The bearing 94L takes a form of a vertically-long hole, and therefore, the pin 92L is loosely inserted into the bearing 94L. On the one end of the keytop 90L, an acting portion 96L is formed. Within the housing 12, a switch substrate 98 is housed, and the switch substrate 98 is provided with a switch contact 100L at a position corresponding to the above-described acting portion 96L. The acting portion 96L and the switch contact 100L function as a switch portion. Additionally, on the switch substrate 98, or separately from the switch substrate 98, a support base 102L is fixedly provided. The support base 102L is mounted with a coil spring 104L at one end thereof. The other end of the coil spring 104L is abutted against or secured to a lower end surface of the keytop 90L nearer to the outside. This causes an elastic force normally pushing the keytop 90L up in an arrow A direction between the support base 102L and the keytop 90L. This is a state where the left switch 32L is released.

It is noted that an elastic body properly elastically pushing the keytop 90L such as leaf spring, rubber, or the like can be used in place of or in combination with the coil spring 104L in the embodiment.

It is noted that the switch substrate 98 may be shared with a circuit board 108 (FIG. 16) described later.

As shown in FIG. 11 and FIG. 12, when the one end, that is, the free end of the keytop 90L is depressed by the fingertip of the index finger LHi of the left hand, a force in an arrow B direction shown in FIG. 14 is applied at this position. When the keytop 90L receives the force, the keytop 90L is pushed down against the elastic force of the coil spring 104L. Accordingly, the acting portion 96L which is formed on a lower surface of a tip end of the keytop is brought into contact to the contact 100L. Thus, the contact 100L, that is, the left switch 32L is turned on.

Here, a reason why the bearing 94L into which the pin 92L of the keytop 90L is inserted is made in a vertically-long hole will be made.

The game machine 10 may be dropped due to a hand-held game machine. At this time, a corner of the hand-held game machine 10, that is, the housing 12 may be bumped against a floor. In the conventional structure, the left switch and the right switch are formed at the corners of the game machine such that its acting portions are operated by inner surfaces (balls) of the index fingers, and the acting portions are normally raised and held by elasticity of the springs. Therefore, assuming that the hand-held game machine is dropped on the floor to bump its corner against the floor surface, a shock is absorbed by the spring, eliminating a possibility of fracture of these right and left switches by the shock.

However, in the hand-held game machine 10 of the embodiment, as described above, as to the left switch 32L, as with a case of the right switch 32R, the pin 92L of the keytop 90L is placed at the outer (corner) of the housing 12 of the hand-held game machine 10 contrary to the related art in order to enable an operation of the fingertip of the index finger. Therefore, in a case that the hand-held game machine 10 is dropped, or in a case that the hand-held game machine 10 is brought into contact to another object 106, a base end side of the keytop 90L directly receives a shock. Accordingly, if the bearing 94L has a little clearance with the pin 92L, the above-described shock is directly transmitted to the pin 92L, having a probability of fracture of the pin 92L.

Therefore, in this embodiment, the bearing 94L into which the pin 92L passes takes a shape of a vertically-long hole. More specifically, the bearing 94L is a long hole with a short diameter and a long diameter. The short diameter is made slightly larger than a diameter of the pin 92L because of being in need of insertion of the pin 92L, and the long diameter is made larger than the short diameter. Then, as illustrated, the bearing 94L is placed such that the long diameter is along a depressing direction of the keytop 90L (arrow B direction). Thus, as shown in FIG. 14, even if another object 106 bumps against the corner of the game machine 10, the base end portion of the keytop 90L, that is, the pin 92L moves to the long diameter direction in the bearing 94L. If a traveling length, that is, a length of the long diameter of the bearing 94L is designed such that an upper end surface of the keytop 90L is made inside an outline (outer line) of the housing 12 when the base end of the keytop 90L is full-depressed, even if the object 106 is bumped, the keytop 90L is merely full-depressed, there is no possibility that a shock is directly conveyed to the keytop 90L. That is, the shock to the keytop 90L from an outside is absorbed by the movement of the pin 92L within the bearing 94L, eliminating damage of the left switch 32L due to the drop of the game machine 10, bump of the object 106 against the corner.

In addition, in this embodiment, an elastic body such as the coil spring 104L is used to elastically push the keytop 90L toward a state that the switch portion is not normally or usually acted, and the elastic body is placed not on the one end of the keytop 90L (nearer to the center of the housing in the horizontal direction) but on the other end (nearer to side surface of the housing), and therefore, the elastic body acts as reducing the shock applied to the pin 92L of the keytop 90L. Therefore, it is possible to effectively prevent the keytop 90L, that is, the left switch 32L from being damaged combined with shock absorbency by the vertically-long shape bearing 94L.

It is noted that the above-described traveling amount is needed to be, at least, the same to a protrusion amount of the keytop 90L from the outline of the housing 12 in a released state or a normal state shown by a dotted line in FIG. 14, but it is preferable that the traveling amount is set to be little larger than the protrusion amount. Thus, even if the game machine 10 is dropped to make the keytop 90L full-depressed, the keytop 90L is completely retracted from the outline of the housing 12, eliminating a possibility of being damaged by a strong shock from the outside, and capable of preventing the left switch 32L from being damaged.

Additionally, in the embodiment, the left switch 32L made as a so-called outer axis switch that the pin 92L is not set at a position nearer to the center of the housing 12 in the horizontal direction, but at a position nearer to the left side surface 52 of the housing 12. On the contrary thereto, conventional same kind of switch is so-called inner axis switch having a pin at the inner side of the housing. In a case of an inner axis switch, each of the bearings has to be formed at a position of the pin, requiring to cut away a large area of the circuit board at the position. When two notches are formed at an upper side of the circuit board, continuity of a board surface is interrupted. Accordingly, a degree of freedom of arranging parts or component on the circuit board is restricted, being hard to realize high density and high integration. On the contrary thereto, if the outer axis switch, as this embodiment is adopted, the bearings for the pins are simply provided at right and left edges, and eliminates the circuit board only at the positions, and therefore, discontinuity of the board surface of the circuit board never occurs in comparison with the related art of the middle of the circuit board being cut away. Thus, in the hand-held game machine 10 of the embodiment utilizing the outer axis switch, there are advantages of securing degree of freedom of arranging parts or components on the circuit board, and of providing further high density and high integration.

Furthermore, in this embodiment, a height of the keytop 90L at the other end (pin 92L side) is, as understood from FIG. 3 and FIG. 13-15, in appropriately the same as the upper edge of the right and left side surface 52, 54 (FIG. 3) of the housing 12 (same plane). Thus, the index fingers can be stably put on the keytop 90L while the fingertips of the index fingers put on the switch portion (acting portion 96L), and the right and left side surfaces 52 and 48 of the housing can be secured by bringing the base of the index fingers LHi, RHi and the palms LHp, RHp extending therefrom into contact thereto, realizing secure and stable holding state of the housing 12. The keytop 90L and the stroke thereof can be made larger, providing superior operability. Especially, even if the hand-held game machine is made compact in size, it is possible to ensure operability of the left and right switches 32L and 32R.

It is noted that although the pin 92L may be formed on the keytop 90L, and the bearing 94L may be formed on the housing 12 in the embodiment, the pin 92L may be formed on the housing 12 and the bearing 94 may be formed on the keytop 90L on the contrary thereto.

As described above, in the hand-held game machine 10 in the embodiment, operations except for with the right and left switches 32L, 32R are carried out by the thumbs RHt and LHt being relatively freely movable. On the other hand, the left and right sides 48 and 52 of the game machine 10 are required to be tightly held with the palms LHp and RHp of the left and right hands as described above in order to stably hold the hand-held game machine 10. Therefore, ranges that the thumbs RHt and LHt reach become relatively narrower. That is, if the palms may be away from the side surfaces of the hand-held game machine, it is possible to operate the operation keys and switches at a relatively distant place with the thumbs RHt and LHt. However, if the palms are released from the side surfaces of the hand-held game machine, the hand-held game machine 10 is liable to become unstable, and therefore, when operating each of the operation keys and the operating switches, it becomes difficult to make the palms away from the side surfaces of the hand-held game machine. This results in making the reachable ranges of the thumbs RHt and LHt narrower.

Therefore, in the hand-held game machine 10 of the embodiment, the start switch 28 to be operated with the left hand thumb LHt and the select switch 30 to be operated with the right hand thumb RHt are placed on a front side inclined surface 26 of the housing 12 so as to be arranged within the reachable ranges of the thumbs RHt and LHt.

Such the start switch 28 and the select switch 30 can be provided on the lower side surface 22 (FIG. 1, FIG. 3) of the housing 12. However, such the arrangement is likely to cause a probability of being hard to depress the start switch 28 and the select switch 30 due to the above-described reachable ranges of the thumbs. This is noticeable in children.

Alternatively, the start switch 28 and the select switch 30 may be placed on the top surface of the housing 12. However, as described above, the hand-held game machine 10 in the embodiment is compact, so that when requirements of providing the display 36 on the top surface of the housing 12 and making the display 36 as large as possible are taken into account, it is unrealistic to provide the start switch 28 and the select switch 30 on the top surface of the housing 12.

Figure 16:
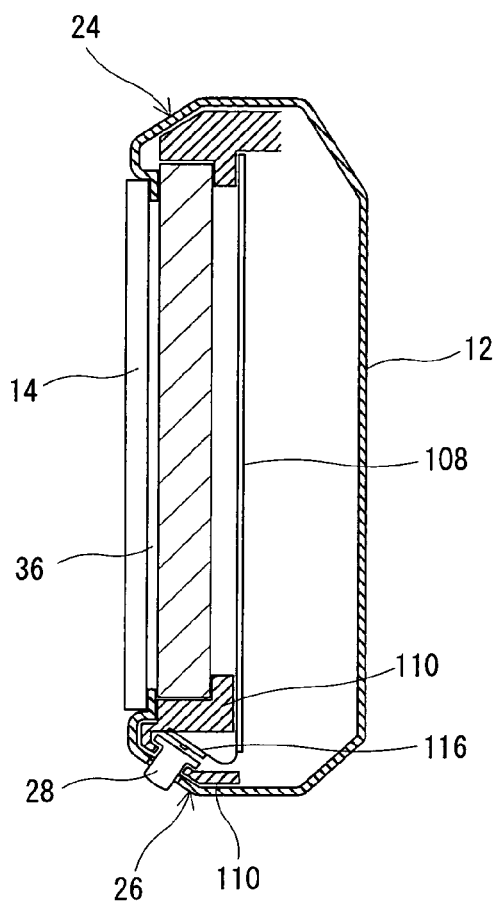
FIG. 16 is a schematic sectional view taken along with lines XVI-XVI of FIG. 7 with an inside omitted.
Figure 17:
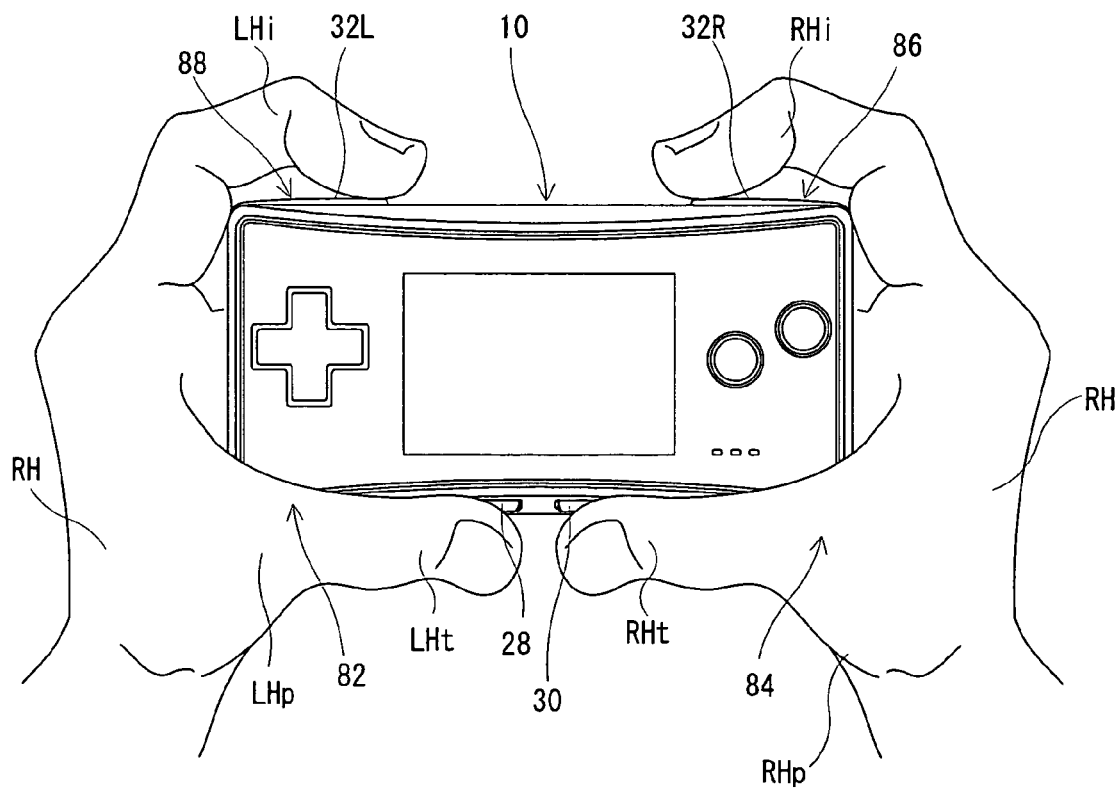
FIG. 17 is an illustrative view showing a state that a start switch and a select switch are operated in the embodiment.

Therefore, in this embodiment, as shown in FIG. 1-FIG. 3 and FIG. 16, the two switches, that is, the start switch 28 and the select switch 30 are provided on the lower inclined surface 26 connecting the lower side surface 22 and the top surface of the housing 12. Thus, as shown in FIG. 17, even when the housing 12 is held with the palm RHp and LHp along the side surfaces 48 and 52 of the housing 12 while the index fingers RHi and LHi are put on the operating means or the first operating means (right switch 32R and left switch 32L), the thumbs RHt and LHt respectively reach the select switch 30 and the start switch 28, making it easy to operate them. Also, the top main surface of the housing 12 is provided with the second operating means (cross key 16, A button 18a, B button 18b) to be operated with the thumbs RHt and LHt, so that when the start switch 28 and the select switch 30, that is, the third operating means is operated following the operation of the second operating means, the third operating means can be operated more easily than a case where the third operating means is placed on the lower side surface 22. It is noted that the select switch 30 and the start switch 28 are formed on the inclined surface 26, and may be called an inclined surface operating means.

Furthermore, when the start switch 28 and the select switch 30 are placed on the lower inclined surface 26, at a time of being operated with the thumb as shown in FIG. 17, an oblique depressing force is applied to the keytops of the start switch 28 and the select switch 30. Accordingly, the depressing force never shakes the housing 12, and when the start switch 28 and the select switch 30 are depressed, so-called unintentionally vibration never occurs. In the hand-held game machine 10 in the embodiment, a depressing force to the keytop by the third operating means is directed to roughly the center of the game machine 10 in comparison with a case that such the depressing type third operating means (start switch 28 and select switch 30) is provided at the lower part of the front (top main surface of the housing 12), and it is depressed to the direction vertical to the surface, and therefore, when the third operating means is operated, a grasped state of the game machine 10 hardly become unstable.

In addition, if the start switch 28 and the select switch 30, that is, the third operating means are thus provided at the lower inclined surface 26, these keytops are viewable from the top main surface direction of the hand-held game machine 10, that is, the front, it is easy to operate the third operating means in comparison with a case that the third operating means is provided on the lower side surface 22. That is, by placing the third operating means on the inclined surface 26 between the top main surface and the lower side surface, operability of the first operating means, the second operating means, and the third operating means will never be compromised.

It is noted that in this embodiment, the start switch 28 and the select switch 30 are placed on the center portion 26a (FIG. 1) on the lower inclined surface 26 as a unity (so as to be adjacent with each other). A reason is that the inclined surface 26 has the largest width at the center portion 26a. That is, while securing the arrangement space of the third operating means (start switch 28 and select switch 30), areas of the right and left side surfaces of the housing 12 are ensured, and therefore, it is possible to ensure larger contacted areas between the both hands RH and LH and the housing when holding the housing 12, making it easy to hold the housing.

It is noted that the start switch 28 and the select switch 30 may be placed away from each other at the left portion 26b and right portion 26c deviated from the center portion 26a as shown in FIG. 18. This causes the thumbs LHt and RHt of the left and right hands to respectively close to the start switch 28 and the select switch 30, making it easy to operate even for children.

As described above, the top surface of the housing 12 and the cover 14 take the shape of pincushion to consequently allow the start switch 28 and select switch 30 to be provided on the lower inclined surface 26 as described above, which offers the following advantage.

As described above, since the cover 14 is put over the housing 12 almost entirely, the cover 14 requires to be provided with the apertures or openings 64, 66, 66b (FIG. 3-FIG. 6) for the operation key 16 and the operation buttons 18a, 18b. On the other hand, forming the apertures on the cover 14 results in reduction in strength of the cover 14. Assuming that the start switch 28 and the select switch 30 are placed on the top main surface of the housing 12, the apertures or openings for the start switch 28 and the select switch 30 are also to be formed on the cover 14, resulting in a risk of further reduction in strength of the cover 14. That is, when the housing 12 is constructed to be covered with the cover 14 like this embodiment, it is necessary to provide the apertures or openings on the cover 14 the same number as the operating switches (keys) arranged on the main surface of the housing 12 to be covered with the cover 14. However, in this embodiment, the start switch 28 and the select switch 30 are formed on the lower inclined surface 26, so that this eliminates a need for apertures or openings except for the apertures 64, 66, 66b on the cover 14. That is, apertures or openings less than the operating switches (keys) are merely provided, and therefore, it is possible to ensure the strength of the cover 14 at a certain level.

FIG. 19 is a cross-sectional view showing structure of a part of the start switch 28 and the select switch 30 in the embodiment shown in FIG. 1 and FIG. 17. As shown in FIG. 16, inside the housing 12, a holder 110 made of plastic, for example, is located for holding the display 36 and the circuit board 108 below the same together. Although not shown, on the circuit board 108 provided are a game computer and other necessary circuit components for executing a game process according to a game program in a cartridge (not illustrated) in response to an operation signal from the operating means (cross key 16, A button 18a, B button 18b, right switch 32R and left switch 32L).

Then, a part of the holder 110 is arranged as being extended to the lower inclined surface 26 of the housing 12. Each of the inclined surface 26 and the holder 110 has horizontally-long throughholes 112a, 114a and 112b, 114b at the center portion 26a (FIG. 1) of the inclined surface 26 adjacent to each other in the horizontal direction of the hand-held game machine 10. The shape and size of these throughholes 112a, 114a and 112b, 114b are designed according to shapes and sizes of the start switch 28 and the select switch 30 (of the keytop). Thus, each of the keytops of the start switch 28 and the select switch 30 is exposed from the inclined surface 26 of the housing 12 through the throughholes 112a, 114a and 112b, 114b as shown in FIG. 19.

It is noted that each of the keytops of the start switch 28 and the select switch 30 is required to emit light of light-emitting diodes described later from a top surface thereof, so that at least a part of it is formed as a light transmission part. In the embodiment, each of the keytops of the start switch 28 and the select switch 30 is entirely made from milky white plastic, and therefore, enabling them to emit light from anywhere.

It is noted that each of the keytops of the start switch 28 and the select switch 30 is provided with stoppers 28a and 30a in a shape of a flange around it at the lower part, and therefore, each of the keytops is never disengaged from the transparent holes 112a, 114a and 112b, 114b.

Referring to FIG. 19, on the lower surfaces of the key top of the start switch 28 and the select switch 30, acting portions 28b and 30b are formed, respectively. In addition, each of the parts of the flange shaped stoppers 28a and 30a of the keytops of the start switch 28 and select switch 30 extend in the opposite direction with each other to form leaf spring portions 28c and 30c. Each of free ends of the leaf spring portions 28c and 30c is secured on a supporting member 116 provided under the holder 110. The supporting member 116 is also used as a supporting member to support a switch board 118 at a position beneath each of the keytops. It is noted that the switch board 118 and the leaf spring portions 28c and 30c may employ different supporting members from each other.

Switch contacts 120 and 122 are provided at positions corresponding to the acting portions 28b and 30b on the top surface of the switch board 118 opposing to the lower surfaces of the keytops of the start switch 28 and the select switch 30. The keytops of each of the switches 28 and 30 is normally pushed by the action of the leaf spring portions 28c and 30c in the direction shown by the arrow C in FIG. 19, and when the keytops are depressed with the thumbs as shown FIG. 17, the keytops are lowered against the elastic force of the leaf spring portions 28c and 30c to contact the acting portions 28b and 30b with the switch contacts 120 and 122.

In this embodiment, more characteristically, on the top surface of the switch board 118, two light-emitting diodes 124R, 124B and 126R, 126B are provided below the keytops of the start switch 28 and the select switch 30, respectively. Both of the light-emitting diodes 124R and 126R are red light-emitting diodes, and both of the light-emitting diodes 124B and 126B are blue light-emitting diodes. These light-emitting diodes 124R, 124B and 126R, 126B are turned on below the keytops of the start switch 28 and the select switch 30 to display reduction of the remaining amount and a charged state of the battery, etc.

Figure 20:
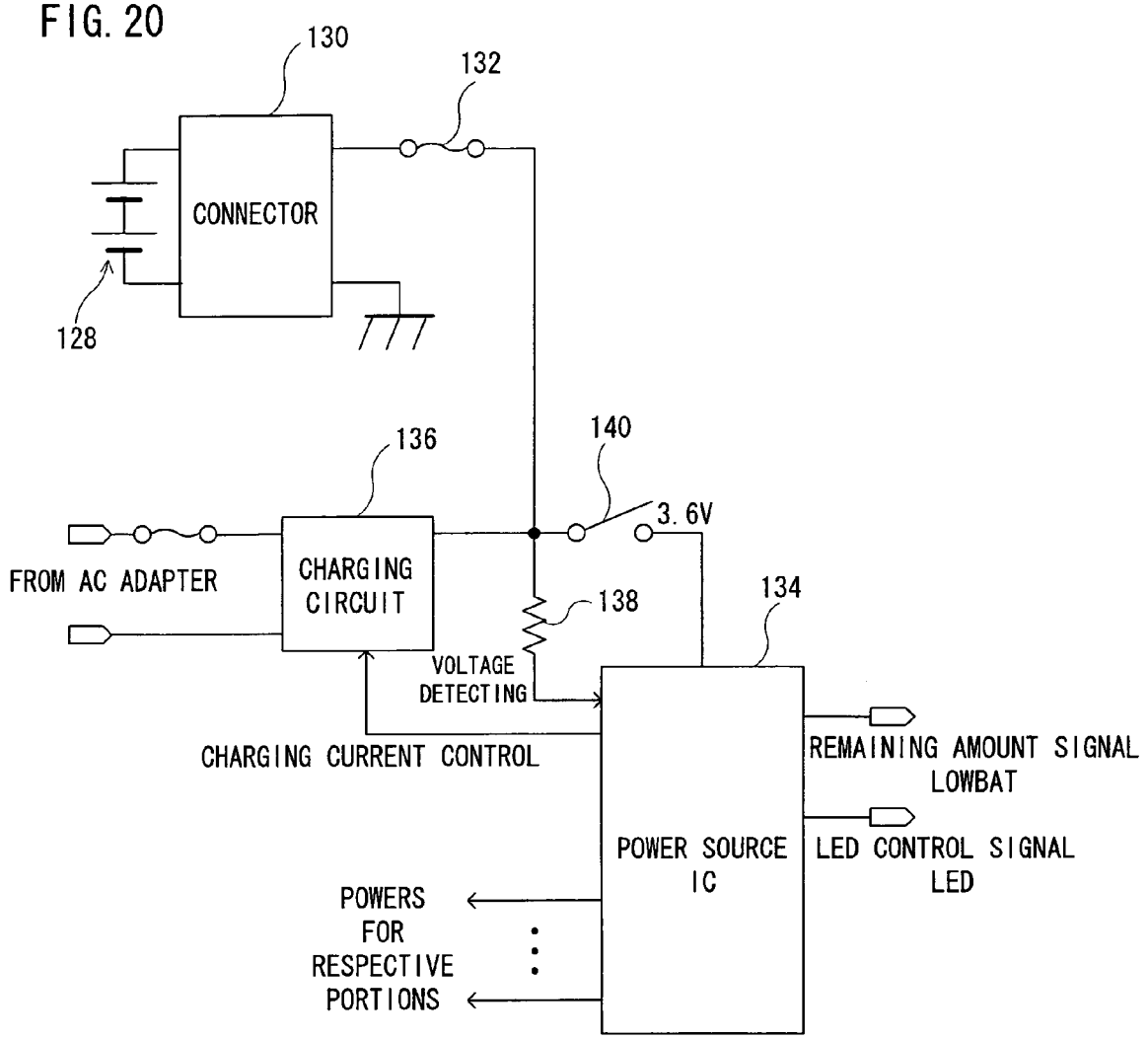
FIG. 20 is a block diagram showing a power-supply circuit of the embodiment.
Figure 21:
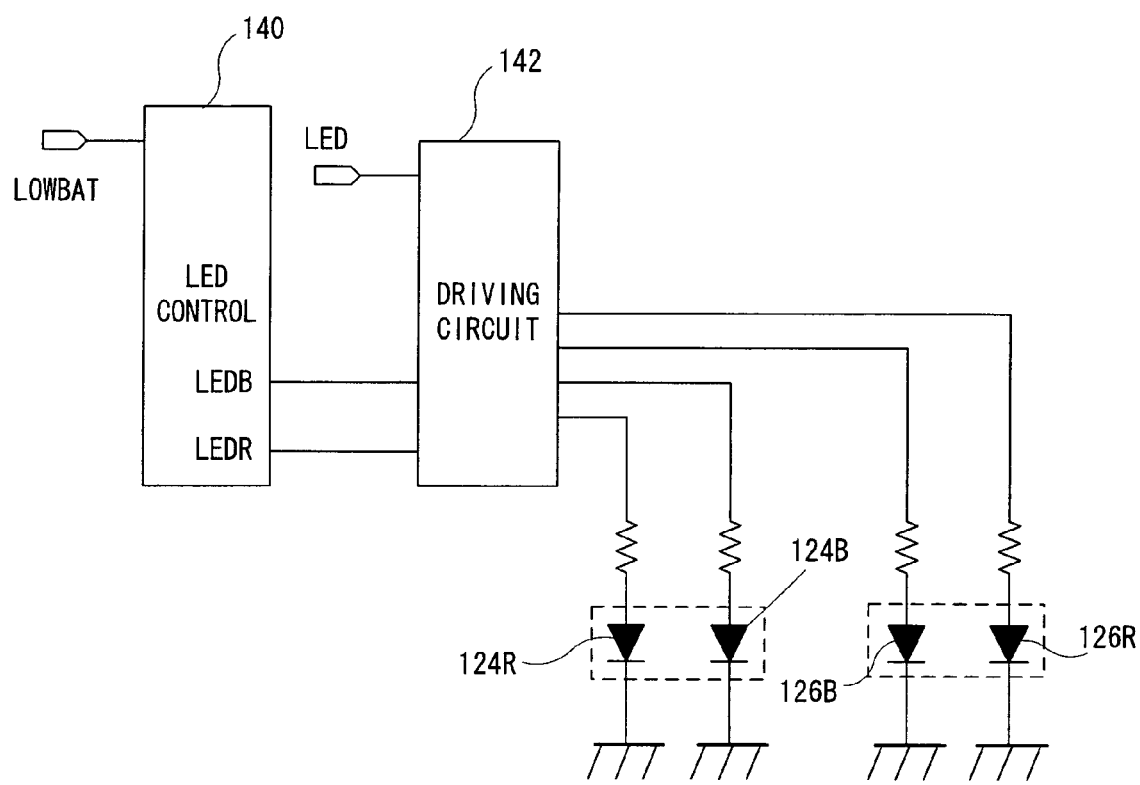
FIG. 21 is a block diagram showing an LED control circuit of the embodiment.

More specifically, FIG. 20 is a power-supply circuit of the hand-held game machine 10 in the embodiment, and FIG. 21 is a driving circuit of the light-emitting diodes 124R, 124B and 126R, 126B. The light-emitting diodes 124R, 124B and 126R, 126B are turned on or off by the driving circuits.

The power supply of the hand-held game machine is supplied by a secondary battery 128 such as lithium-ion, for example, shown in FIG. 20. The battery 128 is connected to a battery connector 130, and from the connector 130, a power is applied to a power supply IC 134 through a fuse 132 and a power switch 40. The power supply IC receives a direct-current voltage from the battery 128, or a direct-current voltage from a charging circuit 136 to generate and output powers required for respective parts of the hand-held game machine. It is noted that the direct-current voltage from an AC adapter (not illustrated) is input to the charging circuit 136, and the charging circuit 136 charges the battery 128 by a direct-current while the direct-current voltage is regulated adjusted through the connector 130. The output of the charging circuit 136 is also applied to the power switch 40, and therefore, the hand-held game machine can be driven by the output from the battery 128 or the output from the charging circuit 136 as described above. A rating of the battery 128 is 3.7-3.8 volts, and a voltage (Vcc) to be input to the power supply IC 134 is in the order of 3.6 volts.

The output of the battery 128 and the output of the charging circuit 136 are also input to a voltage detection input of the power supply IC 134 via a high resistance 138. The power supply IC 134 can detect a remaining amount of the battery 128 and covers and shorts of the output voltage of the charging circuit 136 by detecting the voltage applied to the voltage detection input. For example, the power supply IC 134, by detecting the voltage of the charging circuit 136 in charging the battery 128, performs a feedback control on a charging current from the charging circuit 136 to the battery 128.

The power supply IC 134 outputs a remaining amount signal LOWBAT indicative of "1" for a enough amount of the remaining amount, and "0" for reduction in the remaining amount depending on the remaining amount of the battery 128 thus detected, and outputs an LED control signal LED indicative of "1" when or at a timing the light-emitting diodes 124R, 124B and 126R, 126B are to be turned on, and "0" when they are to be turned off. It is noted that the signal LED is shifted to "0" when the battery 128 is full-charged.

The remaining amount signal LOWBAT and the LED control signal LED are applied to an LED driving circuit in FIG. 21. That is, the remaining amount signal LOWBAT is input to an LED control IC 140, and the LED control IC 140 outputs a signal LEDR indicating whether the red light-emitting diodes 124R and 126R are to be driven or turned off depending on the remaining amount signal LOWBAT. The signal LEDR is output as "1" when the red LEDs are to be driven and as "0" when the the red LEDs are to be turned off. The LED control IC 140 further outputs a signal LEDB indicating whether the blue light-emitting diodes 124B and 126B are to be driven or turned off depending on the remaining amount signal LOWBAT. The signal LEDB is output as "1" when the blue LEDs are to be driven and output as "0" when they are to be turned off.

A driving circuit 142 receives the signals LEDR and LEDB, and the previous LED control signal LED. The LED control signal LED is repeatedly turned on and off for a constant time period (three seconds, for example) when the power switch 40 of the hand-held game machine 10 is turned on, that is, at a time of start-up so as to be blinked. Accordingly, at start-up, the red light-emitting diodes 124R and 126R or the blue light-emitting diodes 124B and 126B blink (start illumination) for a constant time period. It is noted that which is blinked, the red light-emitting diodes 124R and 126R and the blue light-emitting diodes 124B and 126B at start-up depends on the remaining amount of the battery. That is, if the remaining amount of the battery is enough at start-up, the LED control IC outputs the signal LEDR as "0" and the signal LEDB as "1" according to "1" of the signal LOWBAT. In response thereto, the driving circuit 142 blinks the blue light-emitting diodes 124B and 126B according to the signal LED repeating the turn-on and turn-off and the signal LEDB of "1".

Except for the start-up, the LED control signal LED is continuously turned on. Then, when there is an enough amount of the battery and during the game, the LED control IC 140 outputs both of driving signals LEDR and LEDB as "0" responsive to "1" of the remaining amount signal LOWBAT. Accordingly, when there is an enough amount of the battery and during the game, both of the red light-emitting diodes 124R and 126R and the blue light-emitting diodes 124B and 126B are turned off.

It is noted that when the remaining amount of the battery is reduced during the game, the remaining amount signal LOWBAT becomes "0", and the LED control IC 140 outputs the driving signal LEDR as "1", and the driving signal LEDB "0" responsive to "0" of the remaining amount signal LOWBAT. Accordingly, when the remaining amount of the battery is in short during the game, both the blue light-emitting diodes 124B and 126B are turned off, and only the red light-emitting diodes 124R and 126R are continuously turned on.

In addition, during charge of the battery 128, the remaining amount signal LOWBAT is "0" at a start of charging, and therefore, only the driving signal LEDR is output as "1" from the LED control IC 140. Thus, only the red light-emitting diodes 124R and 126R are continuously turned on. Then, when the battery 128 is charged to a certain extent, the remaining amount signal LOWBAT becomes "1", and the LED control IC 140 only outputs the driving signal LEDB as "1". Accordingly, after the battery 128 is charged to a certain extent from the start of charging, only the blue light-emitting diodes 124B and 126B are turned on.

Then, when the battery 128 is full-charged, the LED control signal LED becomes "0", both the driving signals LEDR and LEDB are output as "0" from the LED control IC 140, so that the blue light-emitting diodes 124B and 126 as well as the red light-emitting diodes 124R and 126R are turned off.

As described above, a circuit configuration of the driving circuit 142 causing each of the light-emitting diodes to turn on, turn off, and further blink is not a primary object, can be easily attained from the above description, a detailed description is omitted here.

In this manner, the light-emitting diodes 124R and 126R and 124B and 126 are provided below the start switch 28 and the select switch 30, and changed in their display manner according to the state of the power supply, and whereby, it is possible to easily grasp a state of the power supply while playing the game. In addition, the start switch 28 and the select switch 30 are provided on the inclined surface with respect to a display surface of the display 36, and therefore, even when the start switch 28 and the select switch 30 light up, the light-emission is deviated from the eyes of player, which eliminates a possibility of offending the player's eyes and becoming obstructive to the game.

It is noted that a description is made on the embodiment applying the present illustrative exemplary embodiment to the hand-held game machine 10 hitherto. However, the present illustrative exemplary embodiment can also directly be applied to operation devices for game machine that have not any game functions at all in themselves, that is, game controllers. In order to apply the present illustrative exemplary embodiments to the game controllers, the game functions are eliminated from the hand-held game machine 10 in the embodiment, and a function for transmitting operation signals from the cross key 16, the buttons 18a, 18b, the left right switches 32L, 32R, the start switch 28, and the select switch 30 to a game machine main body (console) with a line or wirelessly may be added to the hand-held game machine 10 in the embodiment. It is noted that such the game controller itself has well been known in the Patent Document 1 cited before and the like, so that a further description will not be needed here.

Although the present illustrative exemplary embodiment has been described and illustrated in detail, it is clearly understood that the same is by way of illustration and example only and is not to be taken by way of limitation, the spirit and scope of the present illustrative exemplary embodiment being limited only by the terms of the appended claims.

Furthermore, as described above, the hand-held game machine 10 in the embodiment can be utilized as a controller (operation device) of another game machine. In this case, the hand-held game machine 10 in the embodiment is merely connected to the game machine through the expansion connector 44, and the display 36 can be utilized as a sub-display according to circumstances.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hand-held game machine, comprising:
   a housing which has a horizontally-long shape, and has, on a front surface, an opening portion, said front surface having upper and lower peripheral edges which are curved so as to become higher at a center in a horizontal direction and become lower toward the right and left end portions when viewed respectively from upper and lower side surfaces;
   a display which is provided at a center portion inside said opening portion of said housing and at a position lower than the upper and lower peripheral edges of said front surface when viewed respectively from the upper and lower side surfaces;
   an operating mechanism which includes a keytop provided at a position higher than the upper and lower peripheral edges of said front surface when viewed respectively from the upper and lower side surfaces in a right and left portions inside said opening portion of said housing; and a separate cover which is attached onto said housing so as to cover said opening portion in a manner such that its upper and lower edges are along the upper and lower peripheral edges of said front surface, wherein said cover includes a transparent window formed at a position corresponding to a position of said display, and an opening which is formed at a position corresponding to a position of said operating mechanism so as to expose said operating mechanism therethrough.

2. The hand-held game machine according to claim 1, wherein said operating mechanism includes at least two operating keys having keytops different in shape from each other at right and left positions sandwiching said display on said front surface, and the opening of said cover includes two openings corresponding to the shape of the keytops of said respective operating keys at right and left positions sandwiching said transparent window.

3. The hand-held game machine according to claim 1, wherein at least the lower peripheral edge of said front surface is formed so as to curve inwardly to said opening portion when viewed from front, said housing is provided with an operating arranging area below the lower peripheral edge of said front surface on the front, further comprising an operating element provided at said operating arranging area.

4. A cover for a hand-held game machine, wherein said hand-held game machine is provided with a housing which has a horizontally-long shape, and has, on a front surface, an opening portion, said front surface having upper and lower peripheral edges which are curved so as to become higher at a center in a horizontal direction and become lower toward the right and left end portions when viewed respectively from upper and lower side surfaces; a display which is provided at a center portion inside said opening portion of said housing and at a position lower than the upper and lower peripheral edges of said front surface when viewed respectively from the upper and lower side surfaces; and an operating mechanism which includes a keytop provided at a position higher than the upper and lower peripheral edges of said front surface when viewed respectively from the upper and lower side surfaces in a right and left portions inside said opening portion of said housing, said cover comprising:

a transparent window having a shape to cover said front surface of said housing and formed at a position corresponding to a position of said display, and an opening which is formed at a position corresponding to a position of the operating mechanism so as to expose said operating mechanism therethrough, wherein said cover is detachable to said housing.

* * * * *